April 14, 1942.                J. E. ILBERY                2,279,681
                             NUT LOCKING DEVICE
                             Filed Nov. 23, 1940
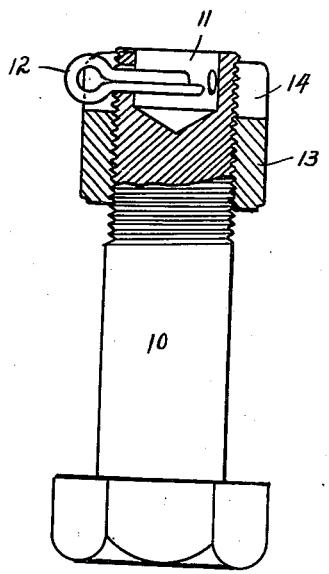
Fig-1-
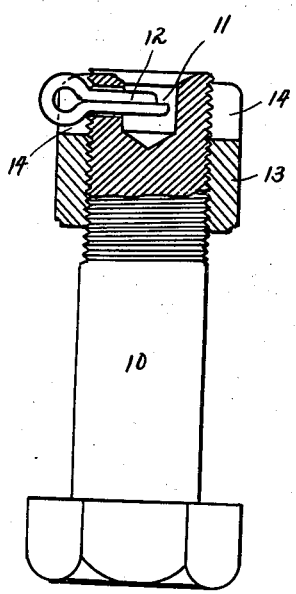
Fig-2-
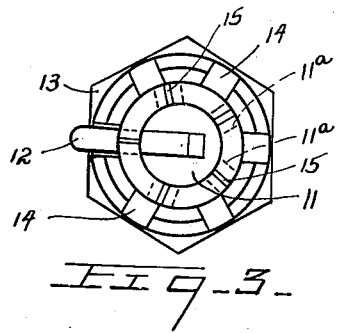
Fig-3-
Inventor.
Josiah Edward Ilbery
By
Attorney Patented Apr. 14, 1942

2,279,681

UNITED STATES PATENT OFFICE 2,279,681

NUT LOCKING DEVICE

Josiah Edward Ilbery, Neutral Bay, New South Wales, Australia

Application November 23, 1940, Serial No. 366,825
In Australia December 8, 1939

2 Claims. (Cl. 151—5)

The objects of this invention are twofold, viz: to provide an efficient and speedy method for locking nuts upon bolts and the like and to embody in that locking method a means to enable much finer adjustment of the nut upon the bolt than is possible with known nut locking devices or methods.

According to this invention these objects are achieved by providing the screw threaded end of the bolt with an axial hole thus forming an annular wall. It is preferred that this hole be countersunk at the outer end but this is not essential. The annular wall is provided with an uneven number (5 for example) of radial holes and the nut is provided with an even number of equally spaced radial slots cut inwardly from one end thereof as, for example, in the present castellated nut. By this arrangement pairs of slots will lie on diametrically opposite points of the axial line of the nut but no two holes in the bolt will be diametrically opposite to one another. The result of this arrangement is that only one slot may be in register with a hole at the same time so that if there are 6 radial slots and 5 holes thirty different locking positions can be obtained in one complete turn of the nut upon the bolt.

In order to lock the nut at any one of the locking positions a cotter pin is used but it will preferably be of a length such that when the head thereof lies in a slot in the nut the ends of the pin will protrude inwardly through the annular wall only to an extent that will enable those ends to be bent outwardly from one another, in the usual manner, without projecting beyond the end of the bolts. It is preferred that one leg of the cotter pin be longer than the other in order to facilitate the operation of parting and bending them when the pin is in position.

The invention, however, will be clearly understood from the detailed description which will now be given and wherein reference will be made to the accompanying drawing in which—

Figure 1 is a side elevation partly in section showing the invention applied to a bolt and using an ordinary castellated nut or the like and wherein the inner end of the axial hole in the screw threaded end of the bolt is coned, the cotter pin being in position in readiness for the ends to be parted and bent within the hole in order to prevent it being displaced by vibration or other causes.

Figure 2 is a similar view to Figure 1 but the axial hole in the bolt is countersunk.

Figure 3 is an end view of Figure 1.

According to this invention the screw threaded end of the bolt 10 is provided with an axial hole 11 which is preferably countersunk as shown at Figure 2. The countersink facilitates the operation of parting and bending the ends of the cotter pin 12. The annular wall surrounding the hole 11 is provided with an uneven number of radial holes 11a through any one of which the end of the cotter pin 12 may pass when a slot 14 is in register therewith. The nut 13 is castellated, i. e., equally spaced radial slots 14 extend inwardly for a suitable distance from one end of the nut, the width of the slots being sufficient to accommodate the head or eye of the cotter pin as shown in the drawings. The legs of the cotter pin are preferably of different lengths so that if the cotter pin is inserted so that the longer leg lies nearer to the inner end of the hole 11 no difficulty will be experienced in parting it from the other member by bending it downwardly by a punch or other suitable tool. The other leg of the cotter pin 12 will be bent upwardly but its length is preferably such that when bent it will not project beyond the end of the bolt.

In practical use circumstances may arise where it is not easy or even possible to see the bolt and nut and in such cases the radial notches 15 formed upon the outer end of the bolt 10 enable a person by touch to determine which slot 14 is in register with a radial slot 14, each notch 15 being in alignment with a hole 11a.

In this specification and claims the use of the words "a nut provided with radial slots" includes that which is known in modern practice as a castellated nut.

I claim:

1. A nut locking device comprising a screw threaded bolt, an axial hole in the screw threaded end thereof, an uneven number of equally spaced unaligned radial holes in the cylindrical wall formed by said axial hole, and a nut having an even number of equally spaced radial slots, the even number of slots being greater than the uneven number of radial holes in the aforesaid cylindrical wall, and a locking pin which passes through a radial slot in the nut aligned with a radial hole in the bolt, said locking pin extending to and terminating in the axial hole in the screw threaded end of the bolt.

2. A nut locking device comprising a screw threaded bolt, an axial hole in the screw threaded end thereof, an uneven number of equally spaced unaligned radial holes in the cylindrical wall formed by said axial hole, notches in said cylindrical wall in alignment with said radial holes, and a nut having an even number of equally spaced radial slots, the even number of radial slots being greater than the uneven number of radial holes in the aforesaid cylindrical wall and a locking pin which passes through a radial slot in the nut aligned with a radial hole in the bolt, said locking pin extending to and terminating in the axial hole in the screw threaded end of the bolt.

JOSIAH EDWARD ILBERY.